April 28, 1964   R. A. FIECHTER ETAL   3,130,686
CONVERTIBLE ROAD AND RAILWAY TRACK VEHICLE
Filed Oct. 8, 1959   6 Sheets-Sheet 1

INVENTORS
René A. Fiechter and
Herbert Gumprecht
BY Brown & Seward
ATTORNEYS

April 28, 1964  R. A. FIECHTER ETAL  3,130,686
CONVERTIBLE ROAD AND RAILWAY TRACK VEHICLE
Filed Oct. 8, 1959  6 Sheets-Sheet 2

INVENTORS
René A. Fiechter and
BY Herbert Gumprecht
Brown & Seward
ATTORNEYS

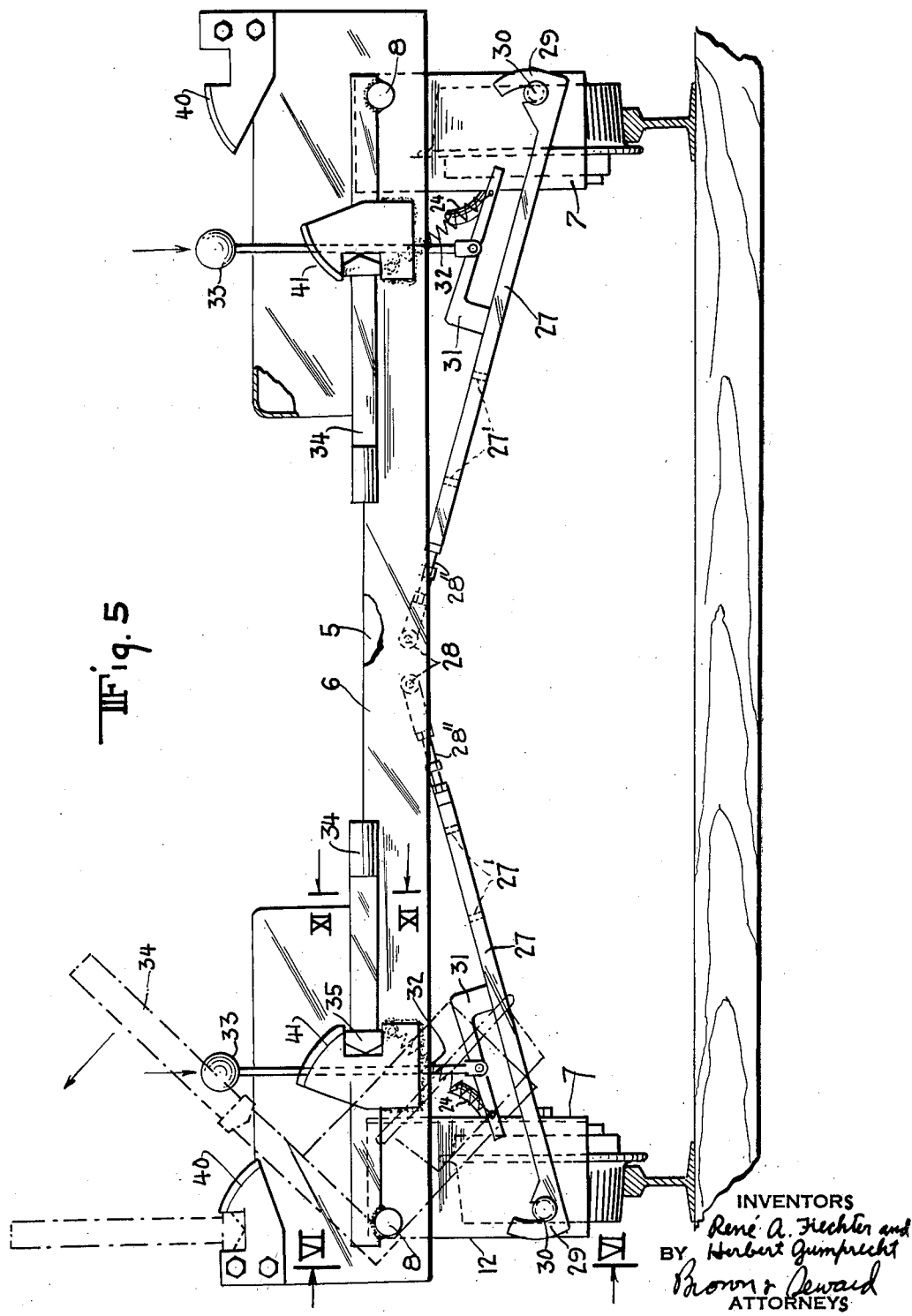

April 28, 1964   R. A. FIECHTER ETAL   3,130,686
CONVERTIBLE ROAD AND RAILWAY TRACK VEHICLE
Filed Oct. 8, 1959   6 Sheets-Sheet 4
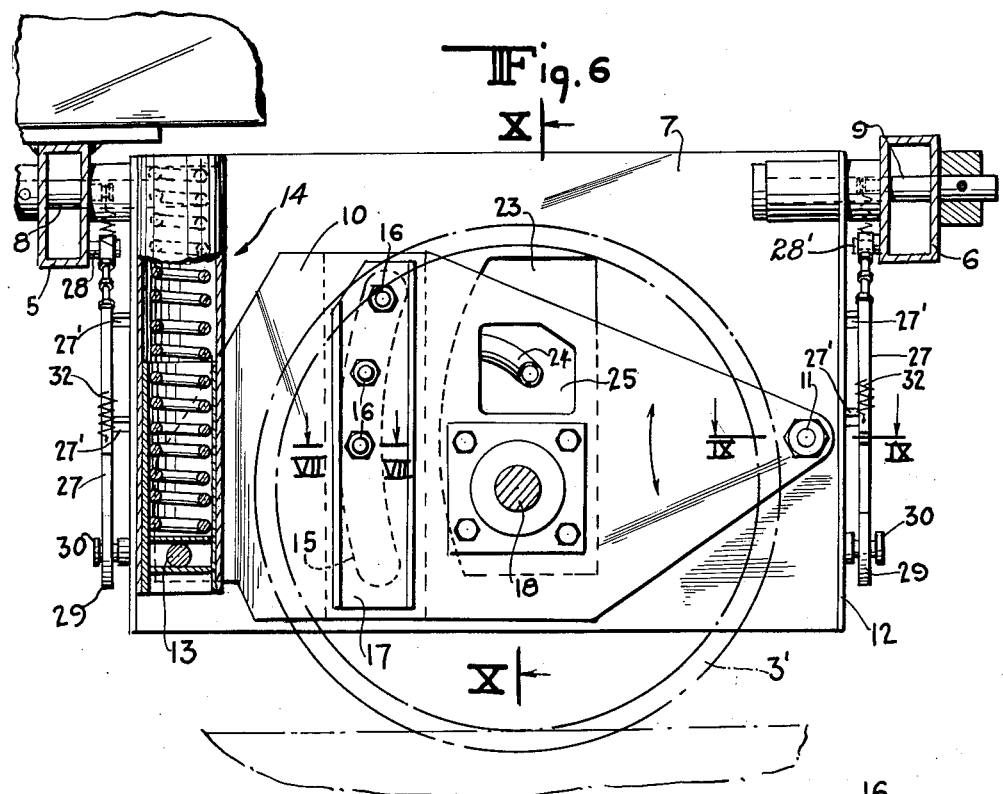
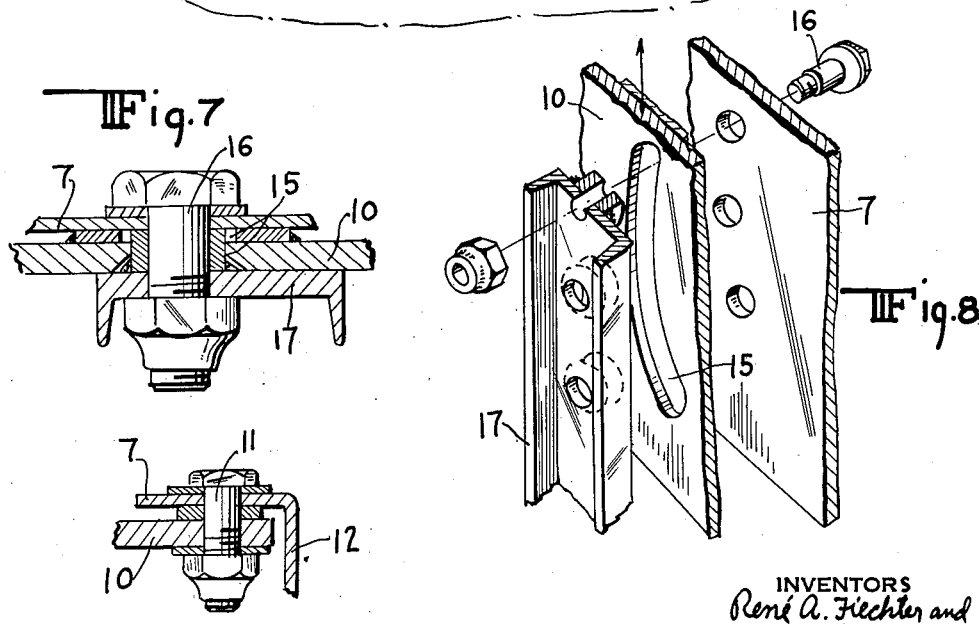
INVENTORS
René A. Fiechter and
BY Herbert Gumprecht
Brown & Seward
ATTORNEYS April 28, 1964     R. A. FIECHTER ETAL     3,130,686
CONVERTIBLE ROAD AND RAILWAY TRACK VEHICLE
Filed Oct. 8, 1959     6 Sheets-Sheet 5
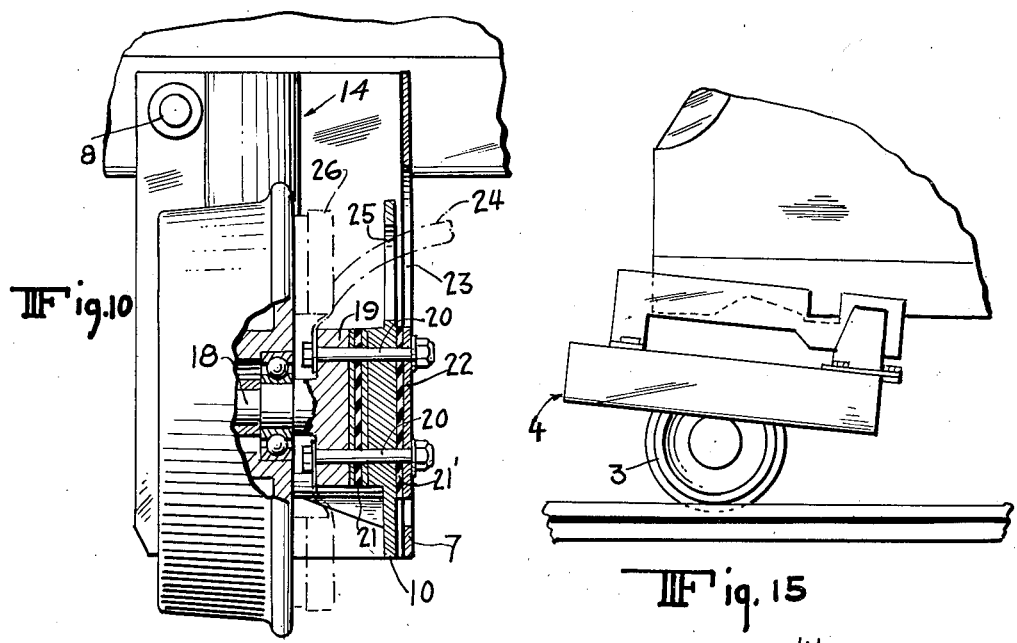
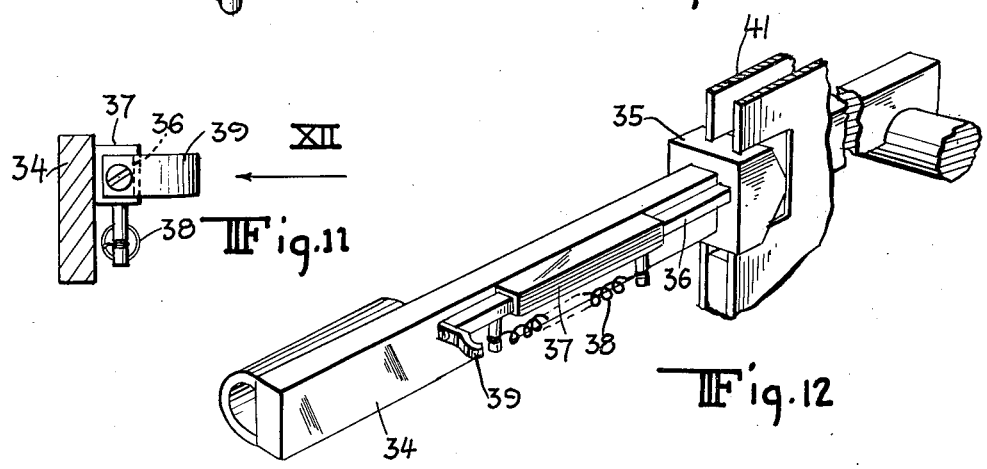
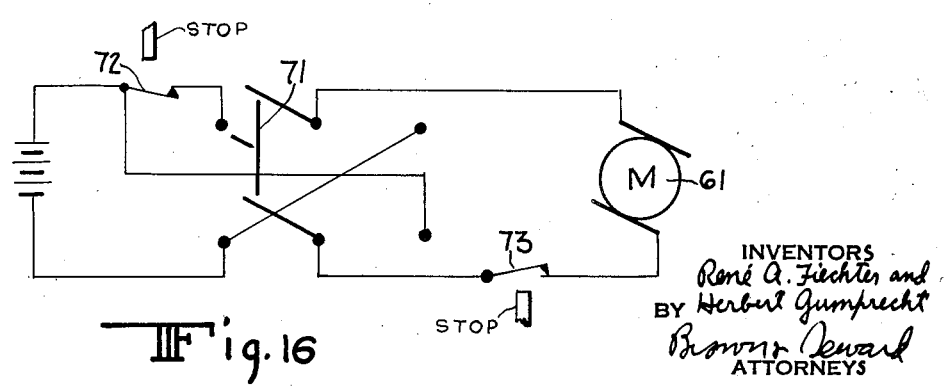
INVENTORS
René A. Fiechter and
BY Herbert Gumprecht
Brown Award
ATTORNEYS April 28, 1964  R. A. FIECHTER ETAL  3,130,686
CONVERTIBLE ROAD AND RAILWAY TRACK VEHICLE
Filed Oct. 8, 1959  6 Sheets-Sheet 6
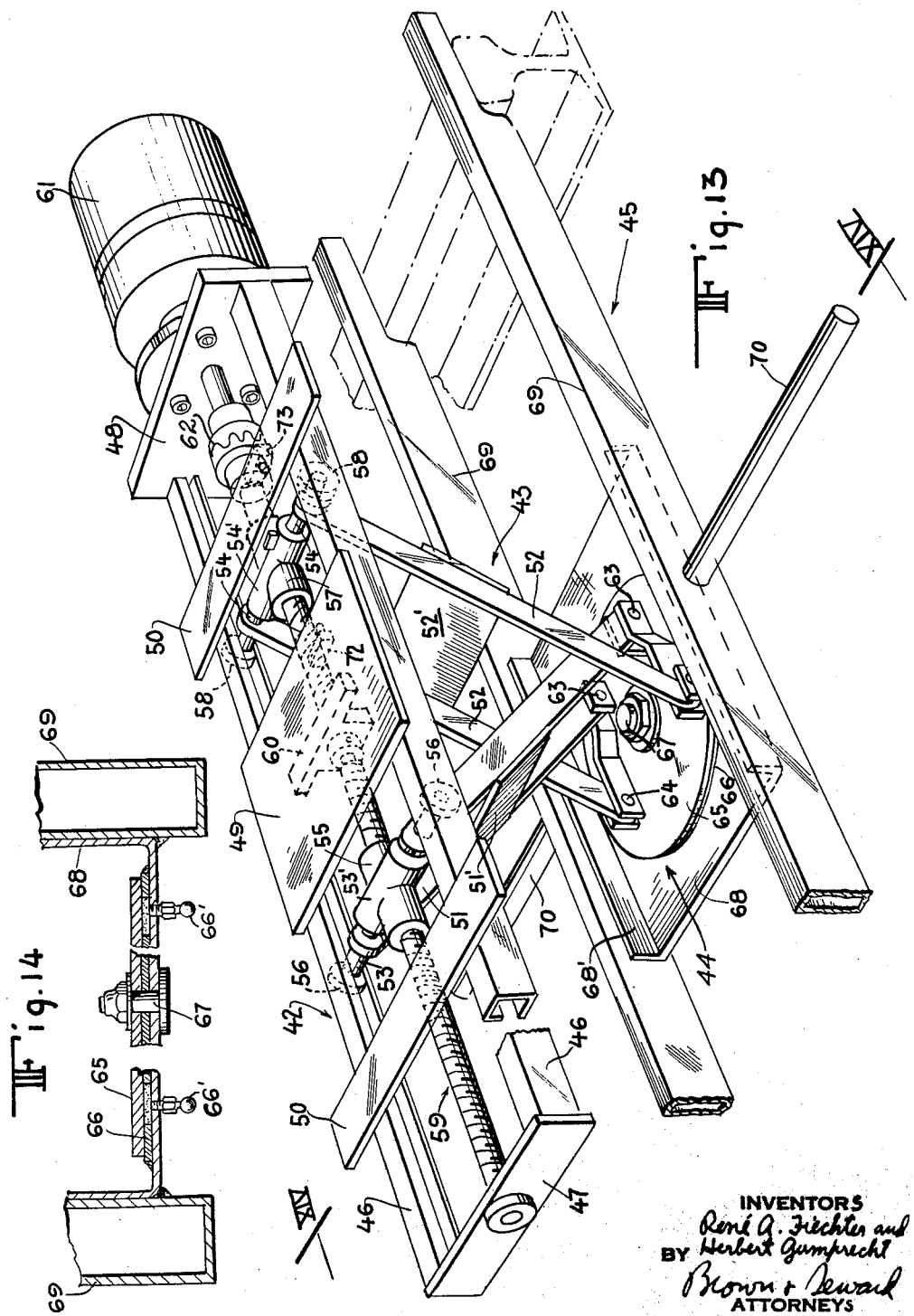

United States Patent Office 3,130,686
Patented Apr. 28, 1964

1

3,130,686
CONVERTIBLE ROAD AND RAILWAY
TRACK VEHICLE
Rene A. Fiechter, 137 Hollywood Ave., Douglaston 63, N.Y., and Herbert Gumprecht, Center Island, Oyster Bay, Long Island, N.Y.
Filed Oct. 8, 1959, Ser. No. 845,108
4 Claims. (Cl. 105—215)

This invention relates to a convertible road and track vehicle, and particularly to an automotive vehicle having normal rubber-tired road wheels supplemented by retractable flanged metal rail wheels.

It is an object of the invention to provide means for lifting the vehicle off the ground independently of the wheels, together with means permitting the vehicle to be rotated 180° or more around a vertical axis when so lifted.

It is a further object to provide strong and simple means for mounting the rail wheels retractably on the vehicle chassis without requiring substantial modification of the latter, but enabling the rail wheels to carry the major proportion of the load when in use.

It is another object to provide such a vehicle which can get on and off a railway track at any point where the adjacent ground surface is such that an automobile can be driven on it; which has brakes on the rail wheels as well as on the road wheels; in which the lifting and lowering of the vehicle, and the operation of the rail wheels, may be entirely independent of the vehicle motor, and in which said motor is preferably in the rear of the vehicle to give bettter forward visibility and better balance.

It is a further object to provide certain improvements in the form, construction and arrangement of the several parts whereby the above named and other objects may effectively be attained.

A practical embodiment of the invention is shown in the accompanying drawings, wherein FIG. 1 represents a perspective rear quarter view of the vehicle, with rail wheels retracted, approaching a section of railway track;

FIG. 5 represents a front (or rear) elevation of the rail wheel mounting and operating mechanism the wheels being in their track-engaging position with one wheel being shown, in broken lines, in a partially retracted position;

FIG. 6 represents a vertical section on the line VI—VI of FIG. 5;

FIG. 7 represents a detail horizontal section on the line VII—VII of FIG. 6;

FIG. 8 represents an exploded detail perspective view of the parts shown in FIG. 7;

FIG. 9 represents a detail horizontal section on the line IX—IX of FIG. 6;

FIG. 10 represents a vertical transverse section on the line X—X of FIG. 6, parts being shown in elevation and parts being broken away;

FIG. 11 represents a detail vertical section through the rail wheel retracting handle, taken on the line XI—XI of FIG. 5;

FIG. 12 represents a perspective view of the rail wheel retracting handle, from the direction indicated by the arrow XII in FIG. 11, with part of the vehicle frame shown and parts being broken away;

FIG. 13 represents a perspective view of the vehicle lifting jack, turntable and associated parts in lifting position on a railway track, only one rail of which is shown;

FIG. 14 represents a detail vertical section through the axis of the turntable, taken on the line XIV—XIV of FIG. 13;

FIG. 15 represents a detail side elevation of a rail wheel, the rail wheel frame and the adjacent corner of the vehicle;

FIG. 16 is a wiring diagram showing the arrangement of controls for operating the lifting jack motor.

Figure 1:
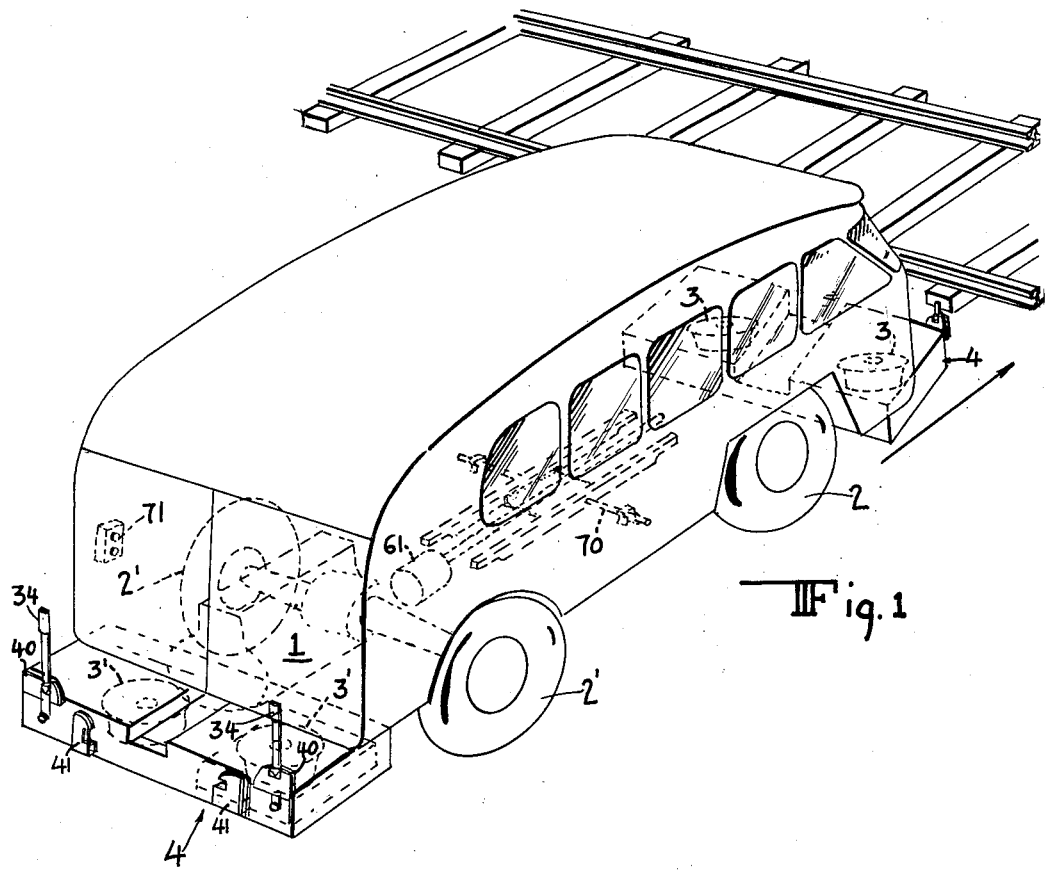

Referring to the drawings, the invention is shown as being embodied in a rear-engined motor vehicle such as current or recent models of the "Volkswagon Micro-Bus," placement of the engine 1 at the rear being of importance in that it permits better forward and downward view of the track while also putting the center of gravity of the vehicle adjacent the middle of its horizontal plan, equidistant from all four road wheels, 2, 2, 2′, 2′. The steering and mounting of the front wheels 2, 2 and the driving and mounting of the rear wheels 2′, 2′ are all standard, as normally provided on the basic vehicle except that the wheels are turned inside out to widen the tread. The additional front and rear pairs of rail wheels 3, 3, 3′, 3′, are all so similarly mounted that only the rear pair 3′, 3′ (at the left of FIG. 1) need be described in detail, with reference particularly to FIGS. 1 and 5 to 12.

The rail wheels 3, 3, are mounted in box-like frames 4 which are firmly fixed to the vehicle chassis frame in positions to project forwardly and rearwardly beyond the vehicle body. In the laterally extending cross bars 5, 6 of the frame 4 there is journaled a flanged plate 7, adapted to swing between horizontal and downward vertical positions around the axles 8, 9. A second plate 10 has one end pivotally secured by the bolt 11 (FIGS. 6 and 9) to the plate 7 adjacent the flanged edge 12 thereof, the opposite end of the plate 10 being provided with a projecting stud 13 in engagement with the coil spring suspension 14. The plate 10 is also provided with an arcuate slot 15, centered on the bolt 11, through which slot pass a plurality of bolts 16 holding the vertical channel iron 17 a fixed distance from the plate 7 to guide the plate 10 in its short arcuate oscillation about the bolt 11 and adjacent the surface of plate 7 (FIGS. 6, 7 and 8).

Each rail wheel 3 or 3′ is journaled with suitable ball or roller bearings on a stub axle 18, shown in FIG. 10 as having a large head 19 through which pass bolts 20 securing it (with the interposition of insulating material 21) to the plate 10. A backing plate 22, spaced from plate 10 by additional insulating material 21′, may also be provided, and the plate 7 is cut out as shown at 23 to provide a space for the backing plate and the heads or nuts on the bolts 20, as well as for the passage of an air or hydraulic brake hose 24 (FIG. 6) which also passes through an opening 25 in the plate 10 to reach the brake indicated generally at 26 (FIG. 10).

In the lowered position of the wheel mounting assembly just described it is braced by a pair of adjustable tie bars 27 pivoted to the cross bars 5, 6 at 28 and 28′ and having hooks 29 at their free ends to engage the headed pins or studs 30 (FIGS. 5 and 6). The tie bars 27 are interconnected by cross braces 27′ and each carries an upward extension 31 to which is secured a spring 32, acting to swing the bars upwardly, and an operating handle 33 (preferably with a rounded grip on top) for pushing the bar down against the spring pressure to disengage the hooks 29 from the studs 30.

Each wheel mounting assembly is designed to be lowered or retracted by the operation of a handle 34 fixed to the plate 7 and extending at a right angle thereto so as to lie parallel to the cross bar 5 when the wheel is down. The handle 34 is provided with a slidable locking block 35 on the end of a push rod 36 passing through the housing 37 on the handle 34, the block and push rod being urged toward locking position by a spring 38 and being manually slidable out of locking position, as by grasping the finger piece 39 (FIG. 12). The frame 4 is provided with hooks 40 and 41, each formed by spaced plates between which the handle 34 may swing, the hook 40 being located in a position corresponding to the raised or retracted wheel position and the hook 41 corresponding to the lowered or "in use" wheel position, and the locking block 35 being adapted to engage each hook for releasably locking the handle 34 (and thus the wheel mounting assembly) in raised or lowered position, respectively.

The mounting and operation of the front rail wheels 3, 3 are substantially identical with the mounting and operation of the rear wheels 3', 3' as just described.

The jack and turn-table assembly (FIGS. 1, 2, 3, 13 and 14) comprises an auxiliary frame 42, the toggle-type jack 43, the turntable 44 and the track (or ground) engaging base 45.

The auxiliary frame 42 includes channel-shaped side tracks 46, a dead-end cross plate 47, a motor mounting end plate 48 and suitable flat horizontal plates 49, 50 through which the whole assembly is fixed to the vehicle frame.

The jack 43 includes two pairs of legs 51, 52 pivotally mounted on axles 53, 54, respectively, and cross braced by plates 51', 52'. The axle 53 passes through a cross tube 53' on the elongated nut 55 while its ends carry rollers 56 running in the tracks 46. The axle 54 similarly passes through a cross tube 54' on the nut 57 while its ends carry rollers 58 also running in the track 46. The nuts 55 and 57 are engaged on the reversely threaded sections of the drive shaft 59 which is journaled at one end in the plate 47, and at the middle in a journal block 60 fixed to the under side of the plate 49. The reversable electric motor 61 is mounted in any convenient manner on the end plate 48; as shown, the motor shaft engages the end of the drive shaft through a coupling or clutch 62 within the frame 42, but this engagement may be outside said frame if desired.

At their lower ends the legs 51, 52 are crossed and mounted on pivot pins 63, 64 in brackets fixed on the upper plate of the turntable 44.

Figure 2:
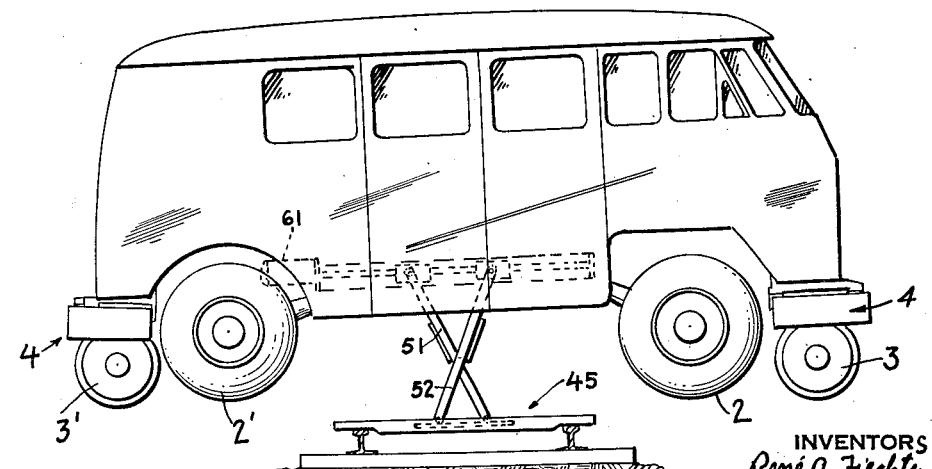
FIG. 2 represents a side elevation of the vehicle lifted above the track, with rail wheels down in position to be lowered onto the track after 90° rotation of the vehicle.
Figure 3:
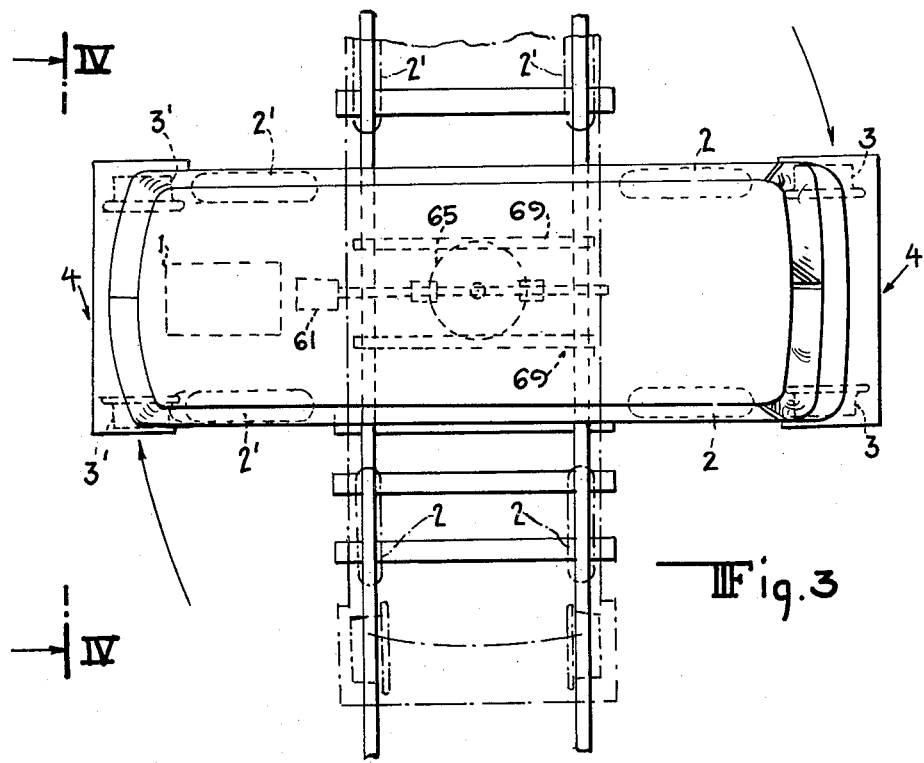
FIG. 3 represents a top plan view of the vehicle in the position shown in FIG. 2, the position after 90° rotation being indicated in broken lines.
Figure 4:
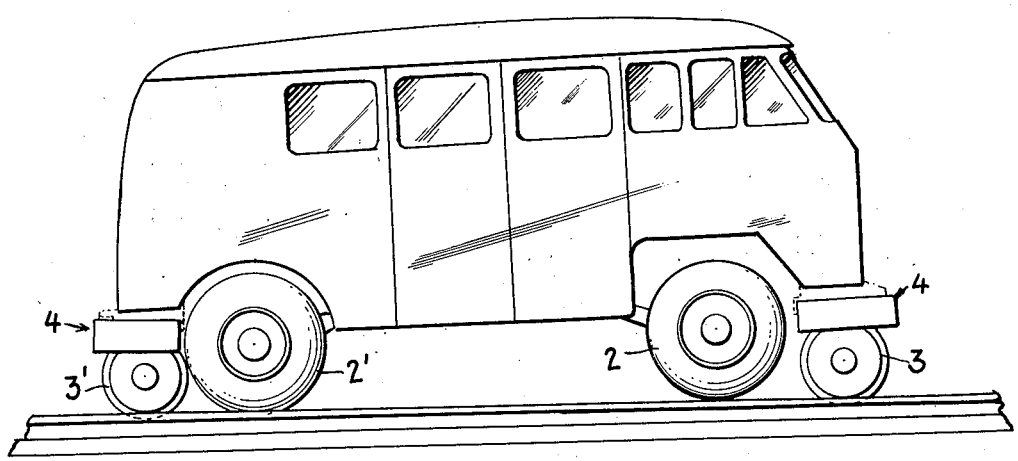
FIG. 4 represents a side elevation of the vehicle resting on the railway tracks.

Said turntable includes the disc-shaped upper plate 65, a matching bearing plate 66 and the king-bolt 67, securing the plates 65 and 66 together. The plate 66 is shown as being welded to the channel-shaped shelf 68 which, in turn, has its flanges 68' welded to the sides of the rectangular tubular saddle bars 69. The saddle bars 69 are somewhat longer than the gauge of the track and are undercut adjacent their ends so as to fit easily on the track rails with their ends overlying the rails, as shown in FIGS. 2 and 13. A turning handle 70 may be fixed to one of the bars 69, extending outward far enough to be grasped easily at the side of the vehicle. Means for lubricating the bearing surfaces of plates 65 and 66 (e.g., from below) may desirably be provided, as indicated at 66'.

The motor 61 is connected in a circuit such as shown in FIG. 16 whereby, at all intermediate points, it may be caused to run in either direction through the actuation of the manual switch 71 (preferably located on the rear of the vehicle, as indicated in FIG. 1) whereas limit switches 72, 73 are provided at suitable points to open the closed circuit when the nut 57 reaches predetermined points corresponding to the lowered and raised positions of the jack. Upon the opening of a circuit by either limit switch, the circuit representing movement away from that limit can be manually closed by means of switch 71 whenever desired.

The operation of the vehicle will be readily understood from the foregoing description of its construction. In FIG. 1 it is shown with rail wheels up being driven on its road wheels toward a section of railway track. When it reaches a position astride the track such that the saddle bars 69 have their ends properly in register with the respective rails the operator throws the switch 71, causing the motor 61 to move the nuts 55 and 57 toward each other and thus lower the turntable and its attached parts. If the vehicle is not in exactly the correct spot or is turned at an irregular angle, the saddle bars can still be guided (as by handle 70) to their proper position on the rails, and the vehicle will thereupon lift itself off the ground to a height such that the road wheels are all above the level of the rails. The center of lift of the jack is approximately in line, vertically, with the center of gravity of the vehicle (including its properly distributed load) and an operator at the front or rear can easily balance the lifted vehicle more or less in the position shown in FIG. 2. Either before or after turning the vehicle into alinement with the rails the rail wheels are lowered by releasing the blocks 35 from the hooks 40, operating the handles 34 to let the wheels down until hooks 29 engage the studs 30 and blocks 35 engage the hooks 41. The tie bars 27 should be adjusted (as by built-in turnbuckles 28") to exactly the proper length for establishing the gauge of the respective pairs of rail wheels. With the rail wheels down, locked and alined with the rails the operator switches the jack motor to lower the vehicle onto the track. When it is resting on the track the saddle bars 69 are turned 90° to be parallel with the fore-and-aft axis of the vehicle and are then fully retracted to their highest position under the chassis frame, and the vehicle may be driven in either direction (preferably forward) on the track.

It is important to note certain details of adjustment. The lowered position of the rail wheels is such that they will carry about 65% of the total weight, with 25% carried by the rear road wheels and 10% carried by the front road wheels. Thus, if the weight is distributed equally between front and rear, the front rail wheels carry 40%, the front road wheels 10%, the rear road wheels 25% and the rear rail wheels 25%. The reason for giving the rear road wheels as much as 25% of the load is to ensure adequate traction, since the vehicle is driven through these wheels by its engine, both on the road and on a track. The load on the road wheels is, however, light enough so that there is very little wear on the rubber tires during rail operation.

The hydraulic brakes 26 on the rail wheels are connected (by hose 24) to the master cylinder of the road wheel brake system, giving very effective braking action under all conditions, the metal-to-metal engagement of the rail wheels on the track being relatively more effective in wet weather. The jack motor is preferably operated from the vehicle battery, so that no additional source of current need be provided.

In order to get the vehicle off the track, or head it in the opposite direction on the track, the lifting operations described above are repeated, with the vehicle being turned 90° or 180° as desired and the rail wheels retracted or not, depending on which type of operation is planned. The rail wheel lifting and lowering is purely manual and mechanical without relying on hydraulic or electric power. For emergency use in case of battery or motor failure the drive shaft 59 may be turned by means of a hand crank (not shown) applied to one end of the shaft, such as the end journaled in the cross plate 47.

It will be understood that various changes may be made in the form, construction and arrangement of the several parts without departing from the spirit and scope of the invention.

What we claim is:

1. In a convertible road and track vehicle, a rail wheel mounting assembly comprising a frame adapted to be fixed to a vehicle chassis, wheel supporting plates pivotally mounted in said frame for swinging movement of 90° between vertical and horizontal positions, a wheel-carrying plate pivotally mounted on each wheel supporting plate for oscillation through a short arc in a plane parallel to the plane of said supporting plate, means for guiding each said wheel-carrying plate in its arcuate oscillation, spring means for resisting said oscillation in one direction and positive means for limiting said oscillation in both directions.

2. In a vehicle according to claim 1, a flanged rail wheel journaled on each wheel-carrying plate and a hydraulic brake fixed on each said wheel-carrying plate and operatively associated with the wheel.

3. In a vehicle according to claim 1, a handle fixed to each wheel supporting plate and perpendicular to the plane of said plate, lock elements fixed to said frame in positions corresponding to the vertical and horizontal positions of the wheel supporting plate, and means carried by said handle for engagement alternatively with each said lock element.

4. A vehicle according to claim 2 in which the lock elements are hooks and in which the means carried by the handle is a locking block slidable on the handle and adapted to engage each of said hooks alternatively.

References Cited in the file of this patent

UNITED STATES PATENTS

| | | |
|---|---|---|
| 260,191 | Gould | June 27, 1882 |
| 824,188 | Mitten | June 26, 1906 |
| 1,402,554 | West Moreland et al. | Jan. 3, 1922 |
| 1,404,479 | Prince | Jan. 24, 1922 |
| 1,669,872 | Gallion et al. | May 15, 1928 |
| 1,953,442 | Sorescu et al. | Apr. 3, 1934 |
| 2,577,830 | Watts, et al. | Dec. 11, 1951 |
| 2,655,872 | Templeton | Oct. 20, 1953 |
| 2,747,836 | Sherman | May 29, 1956 |
| 2,986,102 | Cox | May 30, 1961 |
| 3,020,858 | Perkins et al. | Feb. 13, 1962 |

FOREIGN PATENTS

| | | |
|---|---|---|
| 232,190 | Great Britain | July 23, 1925 |
| 1,009,764 | France | Mar. 12, 1952 |
| 933,033 | Germany | Sept. 15, 1955 |
| 963,242 | Germany | May 2, 1957 |

OTHER REFERENCES

Werner, German application Ser. No. W 10,970, printed Dec. 22, 1955 (Kl. 20d 30), 4 pp. spec., 3 sheets drawings.

"Railway Age" (magazine), Aug. 5, 1957 (page 17 relied on).

"Railway Age" (magazine), Nov. 18, 1957 (page 11 relied on).

Modern Railroad (magazine), September 1958 (page 118 relied on).

UNITED STATES PATENT OFFICE
CERTIFICATE OF CORRECTION

Patent No. 3,130,686                              April 28, 1964

Rene A. Fiechter et al.

It is hereby certified that error appears in the above numbered patent requiring correction and that the said Letters Patent should read as corrected below.

Column 5, line 22, for the claim reference numeral "2" read -- 3 --.

Signed and sealed this 11th day of August 1964.

(SEAL)
Attest:

ERNEST W. SWIDER
Attesting Officer

EDWARD J. BRENNER
Commissioner of Patents